United States Patent
Billig et al.

(10) Patent No.: US 7,197,386 B2
(45) Date of Patent: Mar. 27, 2007

(54) CONTROL SYSTEM FOR A VEHICLE WITH AT LEAST PART-TIME FOUR-WHEEL DRIVE

(75) Inventors: Christian Billig, Munich (DE); Gerhard Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/337,047

(22) Filed: Jan. 23, 2006

(65) Prior Publication Data

US 2006/0113135 A1 Jun. 1, 2006

Related U.S. Application Data

(63) Continuation of application No. PCT/EP04/08146, filed on Jul. 20, 2004.

(30) Foreign Application Priority Data

Jul. 24, 2003 (DE) ................ 103 33 650

(51) Int. Cl.
  *F16D 48/12* (2006.01)
  *G06F 19/00* (2006.01)
(52) U.S. Cl. .............. 701/69; 701/74; 701/93; 192/54.1; 180/247
(58) Field of Classification Search .......... 701/67, 701/68, 69, 71, 74, 79, 91, 93; 192/54.1; 180/247, 248
  See application file for complete search history.

(56) References Cited

U.S. PATENT DOCUMENTS

| | | | |
|---|---|---|---|
| 4,874,056 A | 10/1989 | Naito | |
| 5,060,747 A * | 10/1991 | Eto | .............. 180/197 |
| 5,461,568 A | 10/1995 | Morita | |
| 5,754,970 A * | 5/1998 | Takasaki et al. | .............. 701/87 |
| 6,007,454 A | 12/1999 | Takahira et al. | |
| 6,070,685 A * | 6/2000 | Takasaki et al. | ............ 180/250 |
| 6,105,702 A * | 8/2000 | Showalter | .................. 180/247 |
| 2003/0201130 A1* | 10/2003 | Murakami et al. | .......... 180/248 |

FOREIGN PATENT DOCUMENTS

| | | |
|---|---|---|
| DE | 2 164 324 | 6/1973 |
| DE | 37 41 009 A1 | 6/1988 |
| DE | 195 13 516 A1 | 10/1996 |
| DE | 693 04 449 T2 | 10/1996 |
| DE | 100 54 023 A1 | 5/2002 |
| EP | 0 577 256 A1 | 5/1993 |
| EP | 1 203 687 A1 | 5/2002 |
| GB | 1 379 416 | 1/1975 |

OTHER PUBLICATIONS

International Search Report dated Nov. 11, 2004 w/ English Translation of relevant portion (Four (4) pages).
German Office Action dated Mar. 17, 2004 w/ English Translation of relevant portion (Five (5) pages).

* cited by examiner

*Primary Examiner*—Tan Q. Nguyen
(74) *Attorney, Agent, or Firm*—Crowell & Moring LLP

(57) ABSTRACT

In the case of a control system for a vehicle with at least part-time four-wheel drive, having a control unit which detects or determines quantities proportional to the wheel speeds of all wheels and the vehicle speed, and by means of which the driving torque of a drive unit can be variably distributed to primary driving wheels, which are permanently connected with the drive unit, and to secondary driving wheels which, if required, can be connected with the drive unit, for the distribution of the driving torque, a clutch torque of a transfer clutch arranged between the drive unit and the secondary driving wheels is set by means of the control unit, and the control unit is further developed such that the clutch torque is increased if a difference is detected between the wheel speed of a wheel and the vehicle speed and/or if a difference is detected between the two wheels speeds of the wheels of at least one vehicle side.

8 Claims, 2 Drawing Sheets

CONTROL SYSTEM FOR A VEHICLE WITH AT LEAST PART-TIME FOUR-WHEEL DRIVE

CROSS-REFERENCE TO RELATED APPLICATIONS

The present application is a continuation of International Patent Application No. PACT/UP2004/008146, filed Jul. 20, 2004, and claims priority under 35 U.S.C. § 119 to German Application No. 103 33 650.8-51, filed Jul. 24, 2003. The entire disclosure of the aforementioned documents is herein expressly incorporated by reference. This application contains subject matter which is related to the subject matter contained in application Ser. Nos. 11/336,922 11/336,933, 11/336,934, and 11/336,925 filed on even date herewith.

BACKGROUND AND SUMMARY OF THE INVENTION

The present invention relates to a control system for a vehicle with at least part-time four-wheel drive. More particularly, the present invention relates to a control system for a vehicle with at least part-time four-wheel drive, having a control unit which detects or determines quantities proportional to the wheel speeds of all wheels and the vehicle speed, and by means of which the driving torque of a drive unit can be variably distributed to primary driving wheels, which are permanently connected with the drive unit, and to secondary driving wheels which, if required, can be connected with the drive unit.

Control systems of this type are described, for example, in German Patent Document DE 100 54 023 A1. Accordingly, a torque distribution device is known for changing the torque distribution ratio between the wheels of the front axle and the wheels of the rear axle by a corresponding control of a friction clutch as a longitudinal blocking device (transfer clutch). The driving action of a vehicle can be influenced considerably by the determination of a torque distribution ratio. In particular, the object of German Patent Document DE 100 54 023 A1 relates to the driving dynamics when cornering. In this case, a partially four-wheel-driven motor vehicle may be a basically front-wheel-driven motor vehicle with a rear-wheel drive which can be connected by means of a transfer clutch; a basically rear-wheel-driven motor vehicle with a front-wheel drive which can be connected by way of a transfer clutch; or a permanent all-wheel drive vehicle with a controllable transfer clutch for changing the torque distribution between the front and rear axle.

Generally, as described below, primary driving wheels are the wheels which are permanently connected with the drive unit, and secondary driving wheels are the wheels which, if required, can be connected with the drive unit by way of the transfer clutch.

Furthermore, such known control systems usually have a control of the transfer clutch as a function of the rotational speed difference between a rotational speed of the primary driving axle and the rotational speed of the secondary driving axle (for example, German Patent Documents DE 37 41 009 A1, DE 69304449 T2). In this case, the rotational speeds of the driving axles are detected, for example, by means of separate sensors.

It is an object of the present invention to improve a control system of the previously mentioned type with respect to the control.

The present invention is based on the recognition that, on the one hand, additional rotational speed sensors on the driving axles are cost-intensive and that the regulating of a slip between the drive shafts is too inaccurate with respect to the controlling of the driving dynamics. The precision of the slip control process can be coupled if, as a function of an individual wheel slip, it takes place relative to all four wheels or, as a function of a wheel slip between the individual wheels, it takes place on one (longitudinal) vehicle side respectively.

According to exemplary embodiments of the present invention, in the case of a control system for a vehicle with at least part-time four-wheel drive, by means of a control unit, which detects or determines quantities proportional to the wheel speeds of all wheels and the vehicle speed, and as a result of which the driving torque of a drive unit can be variably distributed to primary driving wheels which are permanently connected with the drive unit, and to secondary driving wheels which, if required, can be connected with the drive unit, the adjusting unit of a transfer clutch arranged between the drive unit and the secondary driving wheels is, therefore, controlled such that the clutch torque and thus the driving torque onto the secondary driving wheels is increased, if a difference is detected between the wheel speed of one wheel and the vehicle speed and/or if a difference is detected between the two wheel speeds of the wheels of at least one (longitudinal) vehicle side (left, right in the driving direction).

The driving torque is the output torque of a drive unit which may consist of an internal-combustion engine and a transmission following it. For this purpose, the control unit defines a wheel-slip-dependent desired clutch torque for increasing the clutch torque, which desired clutch torque is determined as a function of the amount of the difference between the wheel speed of one wheel and the vehicle speed and/or as a function of the amount of the difference between the two wheel speeds of the wheels of at least one vehicle side.

The quantity proportional to the wheel speed of a wheel may be a rotational wheel speed, which is detected and which, in a known manner, can be converted into a wheel speed in meters per second (v) which is directly comparable with the vehicle speed.

The wheel-slip-dependent desired clutch torque may be determined in the control unit by a maximal selection from at least three desired clutch torques: a first desired clutch torque which is determined as a function of the amount of the difference between the wheel speed of a wheel and the vehicle speed; a second desired clutch torque which is determined as a function of the amount of the difference between the two wheel speeds of the wheels of the left vehicle side; and a third desired clutch torque which is determined as a function of the amount of the difference between the two wheel speeds of the wheels of the right vehicle side.

An advantage of the individual wheel slip taken into account by the present invention is the sensitivity, which is twice as high as in the state of the art, by means of which the torque distribution can be controlled. This is particularly advantageous when cornering, because usually only the wheels on the inside of the curve tend to spin. As a result, by means of the invention, an increase of the traction characteristics and of the stability characteristics of the vehicle may be achieved.

Other objects, advantages and novel features of the present invention will become apparent from the following detailed description of the invention when considered in conjunction with the accompanying drawings.

DETAILED DESCRIPTION OF THE DRAWINGS

Figure 1:
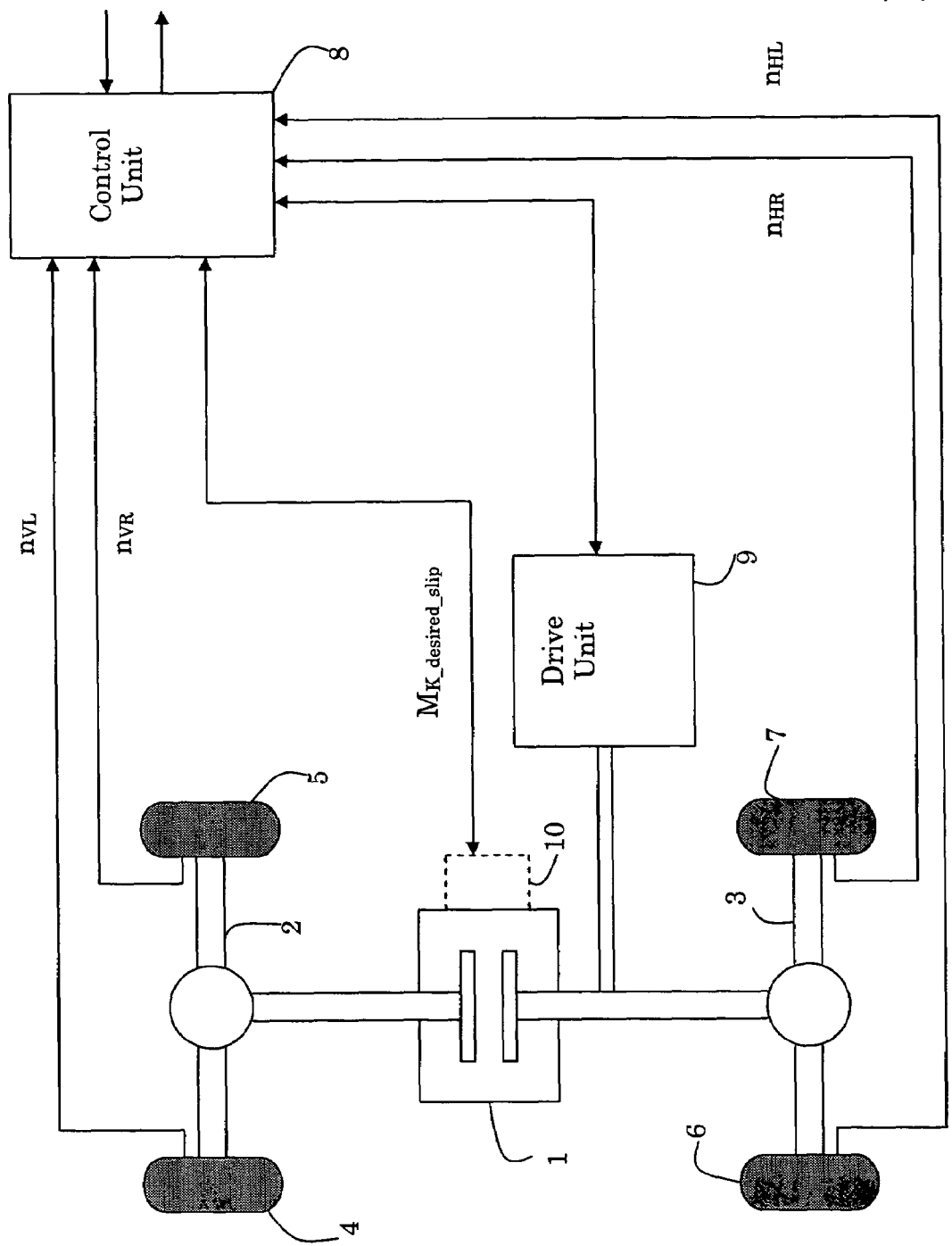
FIG. 1 is a schematic view of a partially four-wheel-driven vehicle with a transfer clutch, which can be adjusted by way of a control unit, on the example of a basically rear-wheel-driven motor vehicle with a front-wheel drive which can be connected by way of a transfer clutch, in accordance with the present invention.

FIG. 1 illustrates a partially four-wheel-driven vehicle in the form of a basically rear-wheel-driven motor vehicle with a front wheel drive which, if required, can be connected by way of a transfer clutch 1. The transfer clutch 1 can be adjusted by a control unit 8. The control unit 8 may contain an outside-disposed additional control unit 10 which, for example, converts the defined desired clutch torque to a current for controlling the adjusting unit (not separately shown here) of the transfer clutch 1.

In the case of a vehicle according to FIG. 1, while the transfer clutch 1 is open, the entire torque (driving torque) of the drive unit 9, which may consist of an internal-combustion engine, a transmission, and at least one drive control unit, is transferred to the wheels 6 and 7 of the rear axle 3. Here, the rear wheels 6 and 7 are the primary driving wheels, because they are permanently connected with the drive unit 9. As the clutch torque at the transfer clutch 1 increases, the drive unit 9 also drives the wheels 4 and 5 of the front axle 2. As a result, the front wheels 4 and 5 are the secondary driving wheels.

In addition to other input signals, the control unit 8 may detect the rotational wheel speeds $n_{VL}$, $n_{HL}$, $n_{VR}$, and $n_{HR}$ of all wheels 4, 5, 6, and 7, respectively. From these rotational wheel speeds $n_{VL}$, $n_{HL}$, $n_{VR}$, and $n_{HR}$, in connection with other information present in the control unit 8, such as the tire circumferences, the wheel speeds $v_{VL}$, $v_{HL}$, $v_{VR}$, and $v_{HR}$ of all wheels 4, 5, 6, and 7, respectively, as well as the vehicle speed $v_{vehicle}$ are determined (compare also FIG. 2).

Figure 2:
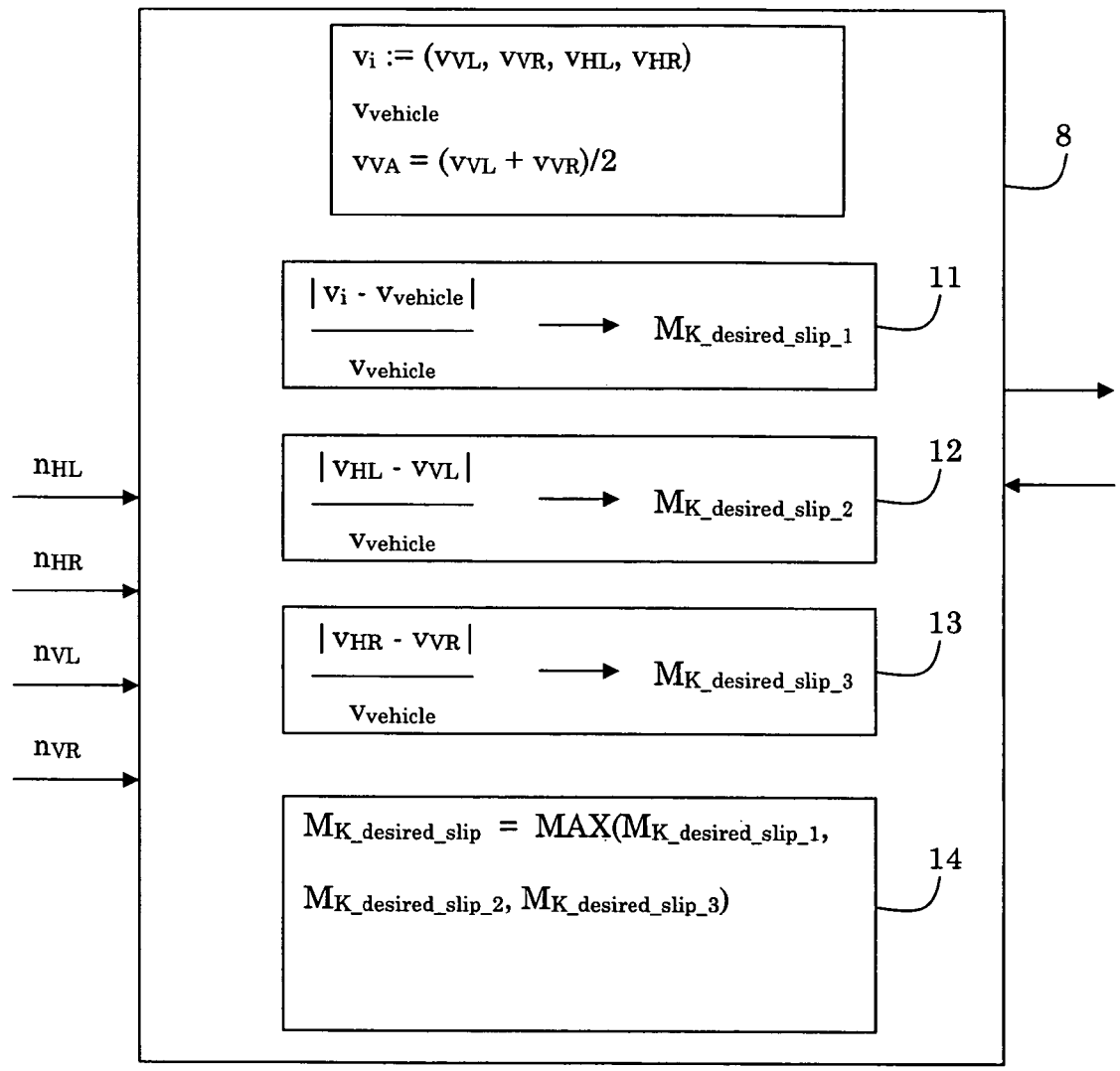
FIG. 2 illustrates an algorithm contained in an exemplary embodiment of a control unit for determining the wheel-slip-dependent desired clutch torque, in accordance with the present invention.

FIG. 2 illustrates additional details of the control unit 8 which may be implemented in exemplary embodiments of the present invention.

For the distribution of the driving torque of the drive unit 9, a clutch torque $M_{K\_desired\_slip}$ to be set is defined for the transfer clutch 1 arranged between the drive unit 9 or the primary driving wheels 6 and 7 and the secondary driving wheels 4 and 5. In principle, the clutch torque is increased if a difference is detected between the wheel speed $v_{VL}$ or $v_{VR}$ or $v_{HL}$ or $v_{HR}$ of a wheel 4 or 5 or 6 or 7 and the vehicle speed $v_{vehicle}$. As an alternative, or in addition, the clutch torque is increased if a difference is detected between the two wheel speeds $v_{VL}$ and $v_{HL}$ or $v_{VR}$ and $v_{HR}$ of the wheels of at least one vehicle side 4 and 6 or 5 and 7.

For simplifying the mathematical process, the differences are determined as relative values in percent, for example, corresponding to the functional blocks 11 to 13 illustrated in FIG. 2. In functional block 11, the amount of the relative difference is determined between the individual wheel speed $v_i$ ($v_{VL}$, $v_{HL}$, $v_{VR}$, $v_{HR}$) of a wheel and the vehicle speed $v_{vehicle}$ relative to the vehicle speed $v_{vehicle}$. In functional block 12, the amount of the relative difference is determined between the two wheel speeds $v_{VL}$ and $v_{HL}$ of the wheels 4 and 6 of the left vehicle side relative to the vehicle speed $v_{vehicle}$. In functional block 13, the amount of the relative difference is determined between the two wheel speeds $v_{VR}$ and $v_{HR}$ of the wheels 5 and 7 of the right vehicle side relative to the vehicle speed $v_{vehicle}$.

The wheel-slip-dependent desired clutch torque $M_{K\_desired\_slip}$ for the clutch torque increase is obtained in functional block 14 from a maximal selection (MAX) from the three desired clutch torques $M_{K\_desired\_slip\_1}$, $M_{K\_desired\_slip\_2}$, and $M_{K\_desired\_slip\_3}$. The first desired clutch torque $M_{K\_desired\_slip\_1}$ determined as a function of the relative difference amount determined in the functional block 11. The second desired clutch torque $M_{K\_desired\_slip\_2}$ is determined as a function of the relative difference amount determined in the functional block 12. The third desired clutch torque $M_{K\_desired\_slip3}$ is determined as a function of the relative difference amount determined in functional block 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for a vehicle with at least part-time four-wheel drive, having a control unit which detects or determines quantities proportional to wheel speeds of all wheels and a vehicle speed, and by means of which a driving torque of a drive unit can be variably distributed to primary driving wheels, which are permanently connected with the drive unit, and to secondary driving wheels which, if required, can be connected with the drive unit, wherein, for the distribution of the driving torque, a clutch torque of a transfer clutch arranged between the drive unit and the secondary driving wheels is set by the control unit, and the control unit is further developed such that the clutch torque is increased if a defined difference is detected between a wheel speed of a single wheel and the vehicle speed, or if a defined difference is detected between wheel speeds of wheels of only one vehicle side.

2. A control system according to claim 1, wherein, for increasing the clutch torque, the control unit defines a wheel-slip-dependent desired clutch torque, which is obtained from a maximal selection from at least three desired clutch torques, including a first desired clutch torque which is determined as a function of the amount of the difference between the wheel speed of the wheel and the vehicle speed, a second desired clutch torque which is determined as a function of the amount of the difference between the wheel speeds of the wheels of the left vehicle side, and a third desired clutch torque which is determined as a function of the amount of the difference between the wheel speeds of the wheels of the right vehicle side.

3. A control system for a vehicle with at least part-time four-wheel drive, having a control unit which detects or determines quantities proportional to wheel speeds of all wheels and a vehicle speed, and by means of which a driving torque of a drive unit can be variably distributed to primary driving wheels, which are permanently connected with the drive unit, and to secondary driving wheels which, if required, can be connected with the drive unit, wherein, for the distribution of the driving torque, a clutch torque of a transfer clutch arranged between the drive unit and the secondary driving wheels is set by the control unit, and the control unit is further developed such that the clutch torque is increased if a defined difference is detected between a wheel speed of a single wheel and the vehicle speed, and if a defined difference is detected between wheel speeds of wheels of only one vehicle side.

4. A control system according to claim 3, wherein, for increasing the clutch torque, the control unit defines a wheel-slip-dependent desired clutch torque, which is obtained from a maximal selection from at least three desired clutch torques, including a first desired clutch torque which is determined as a function of the amount of the difference between the wheel speed of the wheel and the vehicle speed, a second desired clutch torque which is determined as a function of the amount of the difference between the wheel speeds of the wheels of the left vehicle side, and a third desired clutch torque which is determined as a function of the amount of the difference between the wheel speeds of the wheels of the right vehicle side.

5. A control system for a vehicle with at least part-time four-wheel drive, comprising:
   a control unit configured to detect or determine quantities proportional to wheel speeds of all wheels and a vehicle speed, and to variably distribute a driving torque of a drive unit to primary driving wheels, which are permanently connected with the drive unit, and to secondary driving wheels which are connectable with the drive unit,
   wherein, for the distribution of the driving torque, a clutch torque of a transfer clutch arranged between the drive unit and the secondary driving wheels is set by the control unit, and the clutch torque is increased if a defined difference is detected between a wheel speed of a single wheel and the vehicle speed, or if a defined difference is detected between wheel speeds of wheels of only one vehicle side.

6. A control system according to claim 5, wherein, for increasing the clutch torque, the control unit defines a wheel-slip-dependent desired clutch torque, which is obtained from a maximal selection from at least three desired clutch torques, including a first desired clutch torque which is determined as a function of the amount of the difference between the wheel speed of the wheel and the vehicle speed, a second desired clutch torque which is determined as a function of the amount of the difference between the wheel speeds of the wheels of the left vehicle side, and a third desired clutch torque which is determined as a function of the amount of the difference between the wheel speeds of the wheels of the right vehicle side.

7. A method for controlling a vehicle with at least part-time four-wheel drive, comprising the acts of:
   detecting or determining quantities proportional to wheel speeds of all wheels and a vehicle speed,
   variably distributing a driving torque of a drive unit to primary driving wheels, which are permanently connected with the drive unit, and to secondary driving wheels which are connectable with the drive unit,
   setting a clutch torque of a transfer clutch arranged between the drive unit and the secondary driving wheels, for the distribution of the driving torque,
   increasing the clutch torque if a defined difference is detected between a wheel speed of a single wheel and the vehicle speed, or if a defined difference is detected between wheel speeds of wheels of only one vehicle side.

8. The method according to claim 7, further comprising the act of:
   increasing the clutch torque by defining a wheel-slip-dependent desired clutch torque, which is obtained from a maximal selection from at least three desired clutch torques, including a first desired clutch torque which is determined as a function of the amount of the difference between the wheel speed of the wheel and the vehicle speed, a second desired clutch torque which is determined as a function of the amount of the difference between the wheel speeds of the wheels of the left vehicle side, and a third desired clutch torque which is determined as a function of the amount of the difference between the wheel speeds of the wheels of the right vehicle side.

* * * * *